United States Patent [19]
Bernard et al.

[11] 3,869,711
[45] Mar. 4, 1975

[54] MAGNETIC PATTERN RECORDING

[75] Inventors: William R. Bernard; Walter S. Buslik, both of San Jose, Calif.

[73] Assignee: International Business Machines Corporation, Armonk, N.Y.

[22] Filed: Jan. 25, 1974

[21] Appl. No.: 436,765

Related U.S. Application Data

[63] Continuation of Ser. No. 399,902, Sept. 24, 1973, abandoned.

[52] U.S. Cl. .............................................. 360/17
[51] Int. Cl. .............................................. G11b 5/86
[58] Field of Search ....... 360/16, 17, 15; 178/6.6 A, 178/6.6 DD, 23

[56] References Cited

UNITED STATES PATENTS

| | | | |
|---|---|---|---|
| 2,768,049 | 10/1956 | Geiser | 360/16 |
| 2,771,505 | 11/1956 | Avery et al. | 178/23 |
| 2,890,288 | 6/1959 | Newman | 360/17 |
| 3,277,244 | 10/1966 | Frost | 360/15 |
| 3,439,918 | 4/1969 | Walter | 360/17 |
| 3,653,066 | 3/1972 | Royse et al. | 360/17 |
| 3,699,269 | 10/1972 | Smaller | 360/16 |

*Primary Examiner*—Alfred H. Eddleman
*Attorney, Agent, or Firm*—Nathan N. Kallman

[57] ABSTRACT

A pattern is recorded on a magnetic medium by passing the medium across a master rotary element having a predetermined pattern of magnetic and nonmagnetic areas. A first magnetic heat magnetizes the medium in a first direction, and a second head that provides a constant DC field then selectively magnetizes the medium in a different direction in those locations where the magnetic areas of the patterned rotary element do not shield the medium from the field.

7 Claims, 12 Drawing Figures

MAGNETIC PATTERN RECORDING

This is a continuation of application Ser. No. 399,902, filed Sept. 24, 1973, now abandoned.

CROSS REFERENCE TO RELATED APPLICATIONS

In U.S. Pat. application Ser. No. 254,669, filed May 18, 1972, now U.S. Pat. No. 3,838,453, and assigned to the same assignee, a track following servosystem for a tape recorder apparatus is described. The present application discloses a novel method and means capable of registering servo patterns on a magnetic medium, such as a tape for example, prior to recording and reading data. Such servo patterns are effective in the operation of the servosystem described in the cited copending case.

BACKGROUND OF THE INVENTION

1. Field of the Invention

This invention relates to an improved method and means for registering a predetermined pattern of magnetic signals on a magnetic medium by transfer from a master element embodying such pattern.

2. Description of the Prior Art

In the past, there has been a requirement for duplication of a record of magnetically recorded signals. The conventional approach was to copy the data signals that were recorded on a master magnetic tape, by contact transfer of the recorded signals to slave tapes in the presence of an AC bias field. This technique resulted in partial loss of the recorded signal on the master tape, which tended to degrade subsequent copy recordings. Since separate recorders including supply and take-up reels were used for transporting the individual tapes, differences and variations in speed and tension between the recorders would result in variations of the recorded pattern from tape to tape. Thus, when operating with very high density signal patterns, these slippages and stretch of the tapes were detrimental to the accurate readout and use of the transferred data.

Another problem that was experienced was that the master tapes were subject to inadvertent erasure, since the signals were recorded magnetically.

In addition, if a servo pattern was to be written along a tape by a rotating head that scans transversely across the tape, the process would be extremely slow and subject to inaccuracies.

Furthermore, there may be a need to register a pattern of magnetic signals, such as servo pulses or index marks, on a rotary disk for use in a disk file.

SUMMARY OF THE INVENTION

An object of this invention is to provide a novel and improved method and means for transferring a predetermined signal pattern to a magnetic medium.

Another object of this invention is to provide a signal transfer apparatus in which a master element contains a physically embodied pattern, which is nonerasable, that is to be repeatedly transferred and registered magnetically, on slave record media.

Another object of this invention is to provide a signal transfer apparatus wherein the effects of slippage between a master element and a copy medium is virtually eliminated.

In accordance with one embodiment of this invention, a hollow master drum made of nonmagnetic material has a physically constituted pattern of high permeability magnetic material on its surface, formed by photoresist process and by selective plating, or by etching predetermined areas, by way of example. A magnetic head is positioned within the hollow drum adjacent to the inner surface, and a magnetic tape is moved along in contact with the rotating outer surface. Upon application of a constant DC field, the pattern represented by the magnetic elements on the drum is effectively printed along the moving tape as the drum rotates.

In accordance with another embodiment of this invention, the master element having the magnetic-nonmagnetic physical pattern is a rotary disk, and the slave or copy media are rotary disks that are rotated in close relation to the master disk during the copying process. The master disk is preferably rigid, while the copy disks may be of the flexible type. A flexible master disk and rigid copy disks may also be employed.

In either embodiment, there is virtually no relative motion between the master element and copy medium, so that no slippage effects are experienced in the region of magnetic transfer.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figure 3:
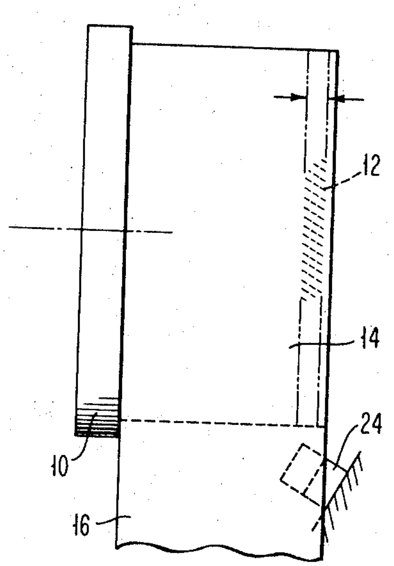
FIG. 3 is a view of the master drum and a portion of the magnetic tape onto which the pattern is copied.
Figure 1:
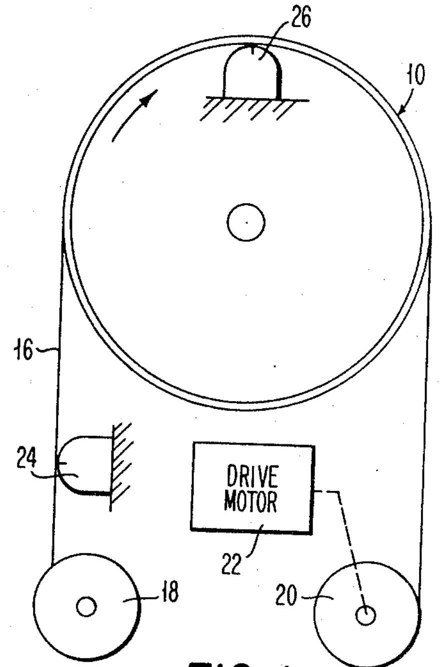
FIG. 1 is a side view of a signal transfer apparatus, in accordance with this invention.
Figure 2:
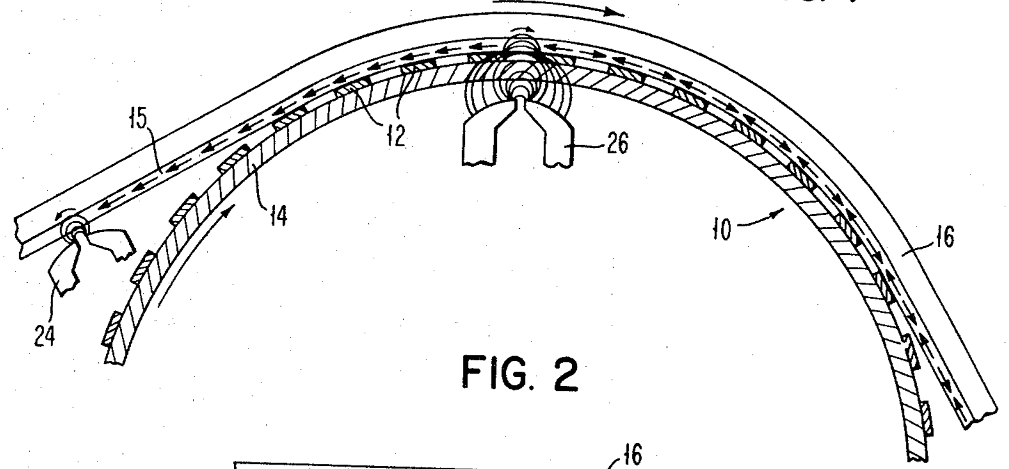
FIG. 2 is an enlarged cutaway view of a portion of the apparatus of FIG. 1.

With reference to FIGS. 1–3, one embodiment of this invention includes a hollow rotary drum 10 which has a pattern of discrete magnetic areas 12 produced by etching, engraving, or plating on the surface of the nonmagnetic body or shell 14 of the drum. The pattern appears as a multiplicity of lands and voids, the lands being formed of discrete areas of soft magnetic material 12, having high permeability and low coercivity; whereas the voids constitute the nonmagnetic portions of the drum shell 14. Any desired pattern may be configured in this manner for transfer from the magnetic drum face to a magnetic medium, such as an elongated magnetic tape 16. The tape includes an oxide layer 15, as is known in the art. The arrows shown in the oxide layer represent the direction of magnetization.

In this embodiment, the transfer apparatus includes a supply reel 18 and take-up reel 20 for transporting the tape 16. A drive motor 22 is coupled mechanically to the take-up reel in a well-known manner. The torque of the drive motor and the tension on the supply reel 18 are such that the oxide layer of the magnetic tape makes intimate contact with approximately 180° of the outer surface of the magnetic drum.

In operation, a first fixed magnetic head 24 is positioned between the supply reel 18 and the magnetic drum 10, so that the head applies a magnetic field that magnetizes the tape and uniformly magnetizes the tape in a direction that is transverse or angular with respect to the longitudinal motion of the tape. This direction of saturation substantially defines the path which the data tracks will follow during the write and read modes.

Figure 4:
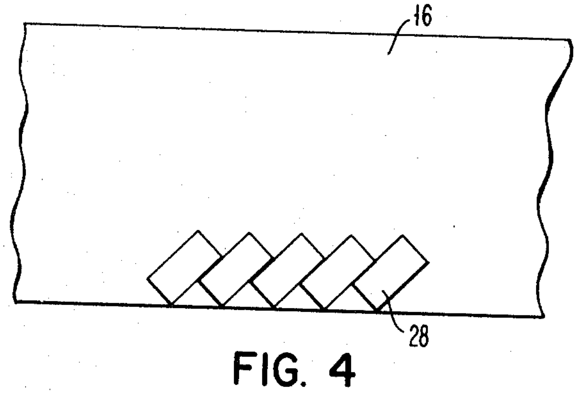
FIG. 4 is a view of a portion of a magnetic tape having a servo pattern registered thereon utilizing the apparatus of this invention.

The tape 16 is transported past the head 24 to engage the outer surface of the drum 10 and into the area of a constant DC field that is applied by a second fixed magnetic head 26, which is located within the hollow drum adjacent to the inner drum surface. This constant DC field effectively magnetizes the tape in a direction opposite to the direction of magnetization established by the first head 24, whenever the tape encounters voids between the magnetic areas 12 of the drum within the DC field. The drum layer supports the highly permeable, soft magnetic material 12 that forms the pattern. The material 12 acts as a shield, and serves to concentrate the DC field provided by the magnetic head 26 at the edges of the magnetic areas. The changes from nonmagnetic areas to magnetic areas of the physical pattern on the drum surface, and vice versa, cause magnetic transitions to be recorded on the tape. The transitions on the tape occur precisely at the interfaces between the magnetic and nonmagnetic areas of the drum pattern. The period of the transitions is dependent upon the physical pattern, i.e., the configuration and spacing of the magnetic areas, and is not dependent on the speed of rotation of the drum, which in this case moves at the same speed as the tape. Because the printing process occurs over a small arc, i.e., a few degrees of drum rotation, and the drum shield layer is not active beyond that arc, the printed pattern is precisely delineated and has high resolution. In this way, a continuous pattern, which may be a series of servo signals 28 (FIG. 4), is recorded along the length of the tape 16.

Figure 5:
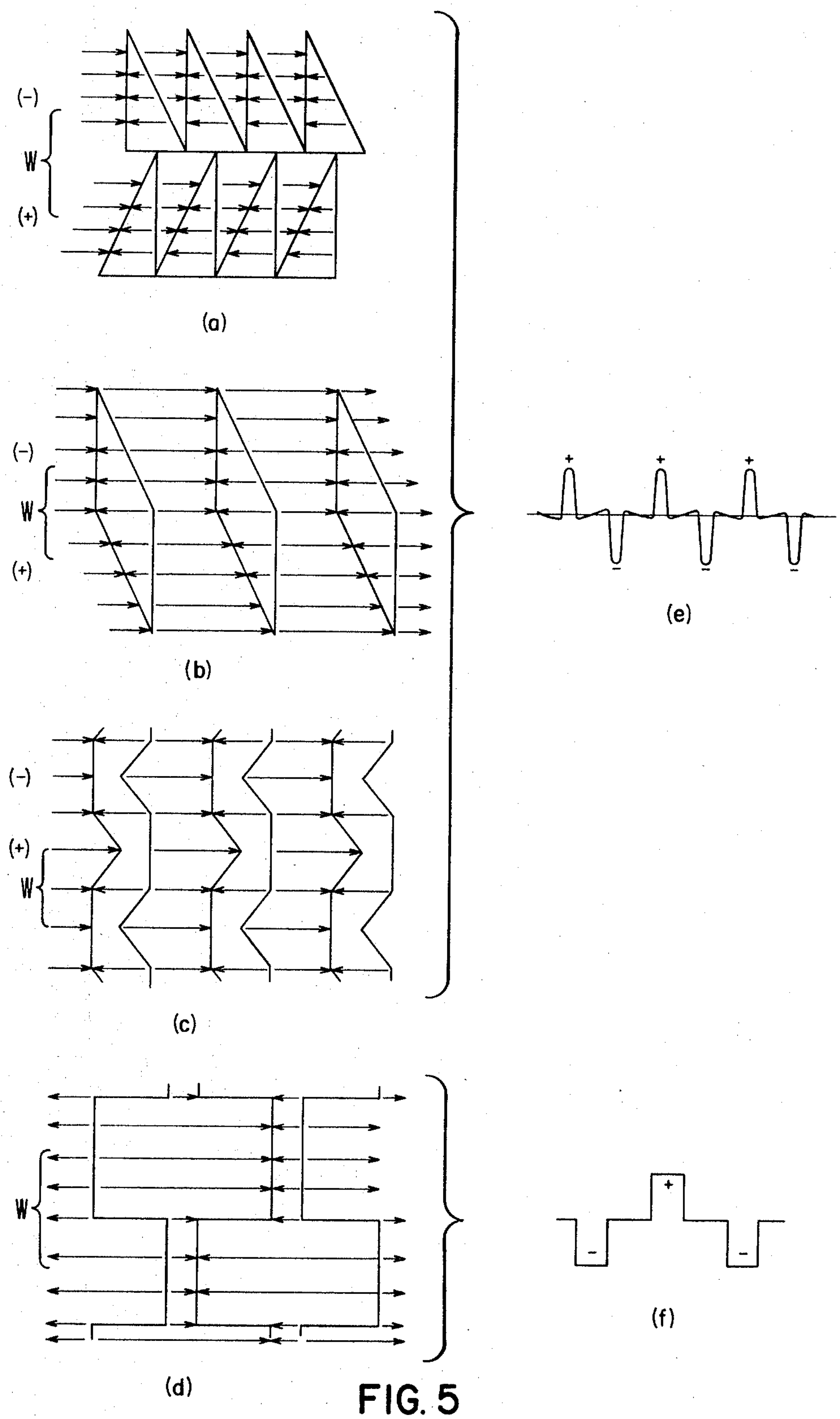
FIGS. 5*a–f* depict various signal patterns and readout signals that may be printed on a magnetic tape by means of this invention.

Various servo patterns may be recorded, which may be read to provide an indication of head displacement from a data track during readout, and a desired track path for the head to follow during the write mode. The magnetic patterns depicted in FIGS. 5a–c represent sawtooth type configurations, and FIG. 5d represents a dipole arrangement, all of which may be utilized for track following servo signals on a magnetic tape. Each of these patterns provide a readout signal (FIG. 5_e_ or 5_f_) that has alternating positive and negative peaks, which are used to give an "off track" indication. The illustrated signals are the "on track" signals readout with a magnetic head having a width W.

Figure 6:
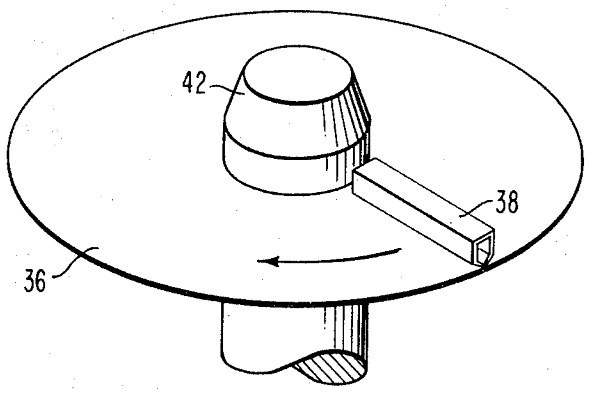
FIGS. 6 and 7 are plan views of a master disk and copy disk, illustrating another implementation of this invention.
Figure 7:
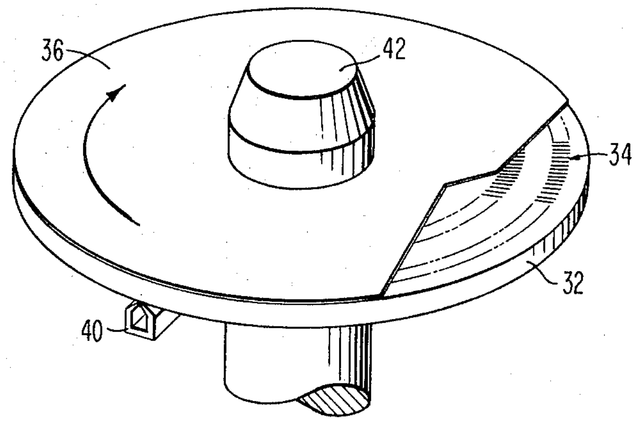

In the embodiment depicted in FIGS. 6 and 7, a master disk 32 has an etched pattern 34 of discrete magnetic and nonmagnetic areas on one surface. A copy disk 36 is first magnetized in one tangential direction by means of a magnetic head 38 having a wide gap aligned radially relative to the disk 36. The wide head gap traverses the entire surface area to be recorded on the copy disk during a single revolution of the disk 36.

Subsequently, the copy disk 36 is placed in close contact with the thin flat master disk 32, so that the premagnetized surface of the copy disk is facing the patterned surface 34 of the master disk. A magnetic head 40 that is positioned adjacent to the master disk surface that is opposite to that patterned surface is energized while the two disks are rotated in unison on a driven spindle 42. As the disks move together, there is no relative motion between the two disks. The magnetic head 40 provides a magnetization of the copy disk at those areas that are not magnetically shielded by the master disk, in effect duplicating the master pattern onto the copy.

The master disk may be a rigid, thin flat element whereas the copy disks may be flexible, or vice versa. As an alternative, a frustoconical master element may be employed with rotary copy disks, wherein the master cone is turned or rolled with its axis aligned radially, and its smaller tapered portion positioned towards the center of the disk. This arrangement allows a correlation of the lengths of the circular tracks of the cone with the circular tracks traced by the copy disks. Apparently, there are various alternatives available for the configuration of the master element and the form of the copy media. However, in accordance with this invention, it is preferable that there is no relative motion between the master patterned element and the copy media as they are moved in unison past the magnetizing head.

The magnetic printing method disclosed realizes savings in hardware and cost, and yields an increase in accuracy of registering a magnetic signal on a magnetic medium. The use of DC fields only, as opposed to prior art use of AC fields, allows higher speed of the master element and the copy media during the transfer process.

It should be noted that the invention is not limited to the particular configurations disclosed above. For example, a constant DC field may be provided by a permanent magnet, instead of a magnetic head, during the printing process. Guideposts and pressure elements may be employed for guiding and for making intimate contact between the copy medium and the master element. Other modifications and changes may be made within the scope of this invention.

What is claimed is:

1. Apparatus for producing a recorded signal on a magnetic medium comprising:

a master element having a permanently formed physical pattern of magnetic and nonmagnetic areas of lands and voids respectively on one surface thereof, said pattern not being magnetizable or erasable by electromagnetic means, said lands being formed of soft magnetic material having high permeability and low coercivity and disposed over a nonmagnetic base;

means for moving said medium in unison with said master element with substantially no relative motion between said medium and said element, while said element and said medium are maintained in close transducing relation;

a magnetic head positioned adjacent to a surface of said master element opposite to said one surface, so that said element is between said medium and said magnetic head, for providing a constant DC field to effectively record on said medium pattern of signals corresponding to said physical pattern.

2. Apparatus as in claim 1, wherein said element is a rotary drum.

3. Apparatus as in claim 2, wherein said medium is a magnetic tape.

4. Apparatus as in claim 1, wherein said element is a rotary disk, and said medium is a magnetic disk.

5. Apparatus as in claim 1, wherein said magnetic head provides a constant DC field.

6. Apparatus as in claim 1, including a second magnetic head for providing a first magnetic field and for uniformly magnetizing said medium in a single direction prior to magnetically coupling said medium with said master element.

7. A method of registering a recorded magnetic pattern on a magnetic medium corresponding to a configured pattern of magnetic and nonmagnetic areas of lands and voids respectively on a nonmagnetizable master element comprising the steps of:

premagnetizing the medium in a prescribed direction;

placing the premagnetized medium in magnetically coupled relation with said configured pattern; and moving the medium in unison with said master element past a magnetizing head;

providing a constant DC field by means of said head, thereby reversing the magnetization of the medium whenever the medium encounters nonmagnetic voids on the master element and thus uniformly magnetizing the medium in selected areas determined by said pattern.

* * * * *